Jan. 6, 1970            J. C. HESLER         3,488,184
SEPARATION AND RECOVERY OF COBALT FROM WASTE STREAMS
CONTAINING COBALT AND ZINC
Filed Feb. 19, 1968
SIMULTANEOUS ZINC SEPARATION AND COBALT RECOVERY BY CATION EXCHANGE
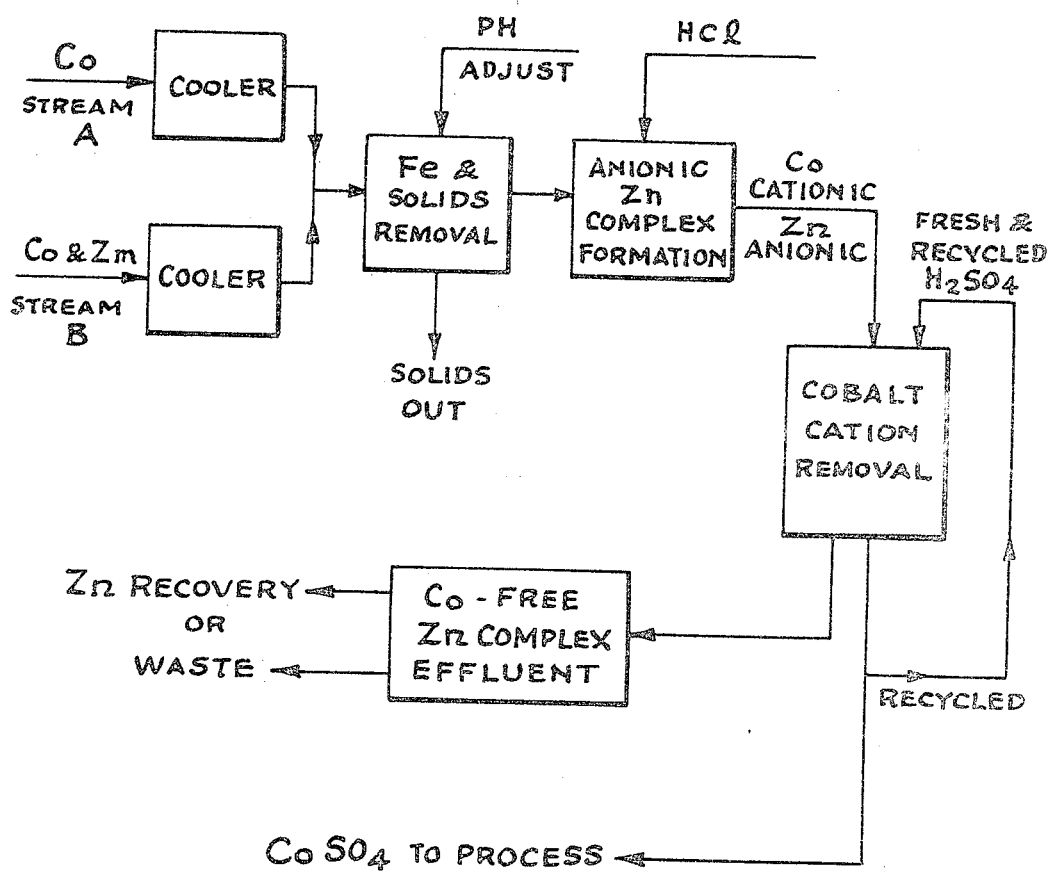
Inventor
James C. Hesler
By Marzall, Johnston, Cook & Root
Attorneys United States Patent Office 3,488,184
Patented Jan. 6, 1970

3,488,184
SEPARATION AND RECOVERY OF COBALT FROM WASTE STREAMS CONTAINING COBALT AND ZINC
James C. Hesler, Clarendon Hills, Ill., assignor to Nalco Chemical Company, Chicago, Ill., a corporation of Delaware
Filed Feb. 19, 1968, Ser. No. 706,530
Int. Cl. C22b 23/04, 19/22, 19/00
U.S. Cl. 75—119
3 Claims

ABSTRACT OF THE DISCLOSURE

A method of recovering catalyst components used in the oxo-alkylation process. In the process, cobalt and zinc catalyst components are separated by converting zinc contained in the mixed waste stream to a complex anionic halide. The waste stream containing the anionic complex zinc and the cobalt in cationic form is then placed in contact wtih a cation exchange resin in the H+ form. Cobalt is sorbed on the resin while the anionic zinc complex is passed in the effluent. The principal improvement in the process lies in recovering cobalt from the waste stream in an inexpensive manner.

The present invention relates to a novel catalyst recovery technique which can be used in the oxo-alkylation process. More particularly, the subject invention is directed to an efficient but inexpensive process for recovering cobalt from a waste stream produced in the oxo-alkylation process.

In the oxo synthesis a catalytic addition of carbon monoxide-hydrogen mixtures to olefins takes place at elevated temperatures and pressures. Aldehydes and/or alcohols are produced having one more carbon atom than the corresponding olefin. Cobalt-containing compounds and in particular cobalt carbonyl compounds, are generally used as catalysts in the process. Zinc also is frequently used as a catalyst component or is present in the catalyst system. In view of the value of cobalt it is necessary to recover this material if the process is to be carried out on a substantial scale. It is often economically feasible, however, to discard the zinc contained in the stream. The processes presently known for recovering cobalt and/or zinc have not been entirely satisfactory from an economical standpoint.

A novel and effective process has been disclosed for separating cobalt and zinc catalysts from a waste oxo-alkylation stream. In the process, (1) zinc is separated from cobalt in the mixed zinc/cobalt waste stream by converting the cationic zinc to a complex anionic halide which is selectively and completely sorbed on a halide salt form of a strong base anion exchange resin. (2) The zinc-free, cobalt-rich effluent is adjusted with NaOH to an optimum pH of 4–6 to remove contaminating iron compounds, air blown, settled, and filtered to remove Fe(OH)$_2$ and Fe(OH)$_3$. (3) The cobalt is then sorbed from the zinc-free, Fe-free, cobalt-rich solution on a cation exchange resin regenerated to the H+ form. (4) Finally, the concentrated cobalt is recovered from the exhausted cation exchanger by regeneration with the same sulfuric acid later used to redissolve the metallic cobalt obtained in the thermal degradation of Co/Zn carbonyl waste so that regeneration is accomplished without regenerant cost.

While the above process is highly effective there is still room for improvement. In particular, the efficient operation of the process requires high concentrations of both HF and HCl to complex the zinc to assure its complete removal from the cobalt-containing stream. The halide, and in particular HF, is expensive when used in substantial quantities.

It is an object of the present invention to provide a relatively inexpensive process for removing cobalt from a solution containing zinc and cobalt.

It is another object of the present invention for recovering cobalt from a waste solution produced in an oxo-alkylation process.

Other objects will become apparent to those skilled in the art from the following detailed description of the invention.

In general, the present invention comprises the discovery of an improved method of using ion exchange materials to recover cobalt from solutions containing cobalt and zinc such as are formed during the oxo-alkylation process. More particularly, the improvement consists in forming an anionic halide zinc complex which zinc complex will be rejected by a cation exchange resin used to sorb cobalt from the stream. Whereas HCl and HF in relatively large quantities are required to insure zinc sorbtion (as an anionic halide) on an anion resin, only minor amounts of the less expensive complexing agent HCl are needed to cause the cation exchange resin used to sorb cobalt to reject the zinc halide anionic complex. Where zinc recovery from the stream is not desired, therefore, the subject process markedly lowers the cost of cobalt recovery substantially by eliminating the anion resin step.

Should zinc recovery be indicated, the use of a zinc recovery unit following selective cobalt recovery is practical. The suggested procedures for recovering the zinc include the following:

(1) The zinc-rich, cobalt-free effluent from the cobalt recovery cation exchange resin could be broken down with minor quantities of alkali such as sodium hydroxide or potassium hydroxide allowing the zinc halide complex to revert to the cationic zinc. The cationic zinc can then be sorbed on an H+ form or Na+ form cation resin;

(2) The cobalt-free, zinc-rich effluent from the cobalt recovery unit can be passed through an anion exchange resin in the sulfate form where HCl is sorbed and a zinc salt is passed. Subsequently, the cationic zinc can be sorbed on a cation resin to yield pure zinc sulfate after H$_2$SO$_4$ regeneration; and (3) The pH of the cobalt-free, zinc-rich acidic effluent from the cation exchange resin can be adjusted by the addition of an alkali such as sodium hydroxide or potassium hydroxide whereby Zn/OH$_2$ is precipitated.

The drawing consists of a flow diagram of a simultaneous zinc separation and cobalt recovery by cation exchange. As can be seen from the diagram, a waste stream containing cobalt and zinc is treated to remove iron compounds and other solids by pH adjustment. As is apparent from the flow diagram, a stream containing cobalt and zinc (stream B) with or without a second stream A containing only cobalt is passed from the oxo-alkylation process equipment through coolers whereupon the pH of the stream is adjusted to remove iron compounds and other solids. A sufficient amount of HCl or its equal is added to complex the zinc. The cobalt and zinc complex mixture is then passed to a cation exchange resin where cationic cobalt is selectively sorbed. The cobalt-free, zinc complex-containing effluent is then passed either to a waste area or to a zinc recovery system. The cation exchange resin is regenerated with H$_2$SO$_4$ which removes cobalt as COSO$_4$.

As was pointed out above, this modified process has as its principal advantage the fact that cobalt can be recovered from waste streams which also contain zinc in an inexpensive manner. Only minor amounts of the less expensive HCl are necessary to cause the cation resin to sorb CO and yet reject the zinc halide anionic complex. The cost of cobalt recovery is thereby greatly reduced.

The amount of HCl added to the waste stream should be sufficient to provide a normality of at least 0.01. The HCl can, of course, be replaced at least in part by other mineral acids capable of complexing zinc. The lower cost of HCl, however, makes this material highly desirable.

The cation exchange resins that can be used to remove cobalt from the process stream include both strong acid and weak acid resins. Preferably, a strong acid cation exchange resin is employed. These resins are made by the nuclear sulfonation of styrene-divinylbenzene beads. Weakly acidic cation exchange resins containing carboxylic groups as the functional sites and chelate resins can be used but are somewhat less effective.

Obviously many modifications and variations of the invention as hereinbefore set forth may be made without departing from the spirit and scope thereof, and therefore only such limitations should be imposed as are indicated in the appended claims.

I claim:
1. A process for separating cobalt from zinc contained in a solution which comprises: adding to said solution a sufficient amount of HCl or other zinc complexing acid to form an anionic zinc complex; passing said solution containing cobalt and said anionic zinc complex through a cation exchange resin wherein the cobalt in said solution is sorbed on said resin and whereby the effluent from said resin includes said anionic zinc complex; and thereafter recovering cobalt from said resin in a usable form.

2. A process as in claim 1 wherein said cation exchange resin is a strong acid cation exchange resin in the $H^+$ form.

3. A process as in claim 1 wherein said effluent from said cation exchange resin is treated with a minor amount of alkali causing the anionic zinc halide complex to revert to cationic zinc; and thereafter sorbing the cationic zinc on a cation exchange resin.

References Cited

UNITED STATES PATENTS

| | | | |
|---|---|---|---|
| 3,128,156 | 4/1964 | Long | 23—312 |
| 3,131,998 | 5/1964 | Swanson | 23—50 |

L. DEWAYNE RUTLEDGE, Primary Examiner

T. R. FRYE, Assistant Examiner

U.S. Cl. X.R.

23—51; 75—120